(12) United States Patent
Hedberg et al.

(10) Patent No.: US 9,979,854 B2
(45) Date of Patent: *May 22, 2018

(54) PRINTER MAINTENANCE GUIDE DEVICE AND PRINTER MAINTENANCE GUIDE METHOD

(71) Applicant: SATO HOLDINGS KABUSHIKI KAISHA, Tokyo (JP)

(72) Inventors: Mats Hedberg, Varberg (SE); Takuya Chiba, Tokyo (JP)

(73) Assignee: SATO HOLDINGS KABUSHIKI KAISHA, Tokyo (JP)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/634,205

(22) Filed: Jun. 27, 2017

(65) Prior Publication Data

US 2017/0302818 A1     Oct. 19, 2017

Related U.S. Application Data

(63) Continuation of application No. 15/107,627, filed as application No. PCT/JP2014/084356 on Dec. 25, 2014, now Pat. No. 9,718,282.

(30) Foreign Application Priority Data

Dec. 26, 2013    (JP) ................................. 2013-268271

(51) Int. Cl.
    *B41J 29/17*    (2006.01)
    *H04N 1/32*     (2006.01)
    (Continued)

(52) U.S. Cl.
    CPC .......... *H04N 1/32657* (2013.01); *B41J 29/17* (2013.01); *H04N 1/00129* (2013.01);
    (Continued)

(58) Field of Classification Search
    CPC . B41J 11/02; B41J 11/04; B41J 11/053; B41J 11/057; B41J 11/06; B41J 11/08;
    (Continued)

(56) References Cited

U.S. PATENT DOCUMENTS 6,721,879 B1    4/2004  Tanaka
9,718,282 B2 *  8/2017  Hedberg ................... B41J 3/46
(Continued)

FOREIGN PATENT DOCUMENTS

JP    02-218039 A    8/1990
JP    07-186496 A    7/1995
(Continued)

OTHER PUBLICATIONS

Chinese Office Action, dated Jan. 2, 2018, 13 pages.

*Primary Examiner* — Kristal Feggins
(74) *Attorney, Agent, or Firm* — Foley & Lardner LLP

(57) ABSTRACT

A printer maintenance guide device includes a guide command button for commanding a maintenance guide for a maintenance work, and a moving image memory storing moving images for successively and continuously displaying a whole process of the maintenance guide from start to end at once on a display unit by the operation of the guide command button.

9 Claims, 6 Drawing Sheets

(51) Int. Cl.
*H04N 1/00* (2006.01)
*G06F 3/0481* (2013.01)
*G06F 3/0484* (2013.01)

(52) U.S. Cl.
CPC ..... *H04N 1/00424* (2013.01); *H04N 1/00506* (2013.01); *G06F 3/04817* (2013.01); *G06F 3/04842* (2013.01); *H04N 2201/3267* (2013.01); *H04N 2201/3274* (2013.01); *H04N 2201/3284* (2013.01)

(58) Field of Classification Search
CPC ....... B41J 11/10; B41J 11/13; H04N 1/32657; H04N 1/00506; H04N 1/00424; H04N 1/00129; H04N 2201/3284; H04N 2201/3274; H04N 2201/3267
See application file for complete search history.

(56) References Cited

U.S. PATENT DOCUMENTS

| | | |
|---|---|---|
| 2007/0237537 A1 | 10/2007 | Hasegawa et al. |
| 2012/0093526 A1 | 4/2012 | Yasui |
| 2012/0140263 A1 | 6/2012 | Oba |
| 2012/0140284 A1 | 6/2012 | Tashiro et al. |
| 2012/0201510 A1 | 8/2012 | Takiguchi |
| 2012/0287457 A1 | 11/2012 | Ishii |
| 2013/0176593 A1 | 7/2013 | Nakamura |

FOREIGN PATENT DOCUMENTS

| | | |
|---|---|---|
| JP | 11-191822 A | 7/1999 |
| JP | 2000-003262 A | 1/2000 |
| JP | 2005-208335 A | 8/2005 |
| JP | 2006-137051 A | 6/2006 |
| JP | 2006-217391 A | 8/2006 |
| JP | 2006-317919 A | 11/2006 |
| JP | 2007-336298 A | 12/2007 |
| JP | 2008-085893 A | 4/2008 |
| JP | 2008-162087 A | 7/2008 |
| JP | 2008-290420 A | 12/2008 |
| JP | 2010-278986 A | 12/2010 |
| JP | 2011-059422 A | 3/2011 |
| JP | 2012-119995 A | 6/2012 |
| JP | 2012-165344 A | 8/2012 |
| JP | 2012-234126 A | 11/2012 |
| JP | 2013-143688 A | 7/2013 |

* cited by examiner

PRINTER MAINTENANCE GUIDE DEVICE AND PRINTER MAINTENANCE GUIDE METHOD

CROSS REFERENCE TO RELATED APPLICATIONS

The application is a continuation application of U.S. application Ser. No. 15/107,627, filed Jun. 23, 2016, which is the National Stage of Application No. PCT/JP2014/084356 filed on Dec. 25, 2014, which is based upon and claims the benefit of priority from Japanese Application No. 2013-268271, filed Dec. 26, 2013, the entire contents of all of which are incorporated herein by reference.

TECHNICAL FIELD

The present invention relates to a printer maintenance guide device and a printer maintenance guide method and particularly to a printer maintenance guide device and a printer maintenance guide method designed to display a maintenance guide using moving images according to various error contents or various maintenance operations in a printer.

BACKGROUND ART

Conventionally, when a certain error or trouble occurs in a state where a printer is operated by one of various printing methods, the content of that error is displayed on a display unit of the printer (e.g. display formed of liquid crystal or the like) and an error warning is also given by voice if necessary. A printer thus configured is disclosed in JP2000-3262A.

There are various contents of the error such as the exhaustion of a print paper sheet, the intermediate breakage of the print paper sheet, the exhaustion of a thermal transfer ink ribbon and the intermediate breakage of the thermal transfer ink ribbon in the case of a thermal transfer printing method, a paper sheet jam and a ribbon jam, a trouble of a printing head, a trouble of a detection unit caused by various sensors such as a position detection sensor and, further, troubles of a print paper sheet cutting unit, an RFID (Radio Frequency Identification) antenna unit equipped according to need, and a user using the printer generally needs to deal with such errors.

The procedure of an error processing guide corresponding to an error content is, for example, displayed for this dealing process. As a technique for this display, pictures, moving images and the like may be adopted according to a status of progress of an error processing work.

SUMMARY OF INVENTION

However, it is difficult for a novice or an unfamiliar person apart from people familiar with such an error processing work to grasp the entire error processing work since the next work procedure is first displayed in the pictures, the moving images and the like after a certain work is performed, and the novice or the unfamiliar person is anxious about whether or not the work he just performed is really proper, what will happen if another work is performed, how the next procedure is and the like. Thus, it is difficult to perform the work smoothly and easily at ease.

Further, it is necessary to provide a sensor for detecting each status or state of progress of the error processing work as a mechanism equipped in the printer.

Further, even if no error occurs in the operation of the printer, there are cases where it is necessary to confirm various maintenance works of performing various maintenance operations similar to an error processing corresponding to the error content. Also in such a case, it is desired to perform an actual work smoothly and easily at ease after the entire maintenance work is first grasped.

The present invention was developed in view of the problems as described above and aims to provide a printer maintenance guide device and a printer maintenance guide method enabling a maintenance work to be easily performed.

In aspects of the present invention described below, it is focused to display a whole process of a maintenance guide at once by moving images when an error or trouble occurs in the operation of each part (a detection unit and, further, a cutting unit and an RFID antenna unit possibly equipped in the printer, let alone a print paper sheet feed unit and a printing unit) or when it is necessary to confirm a maintenance work.

According to a first aspect, there is provided a printer maintenance guide device with a printer main body, a print paper sheet feed unit for feeding a print paper sheet, a printing unit for performing printing on the print paper sheet and an operation unit and a display unit for operating the printing unit, the printer maintenance guide device including a guide command button enabling a content of an error to be displayed on the display unit when the error occurs in the operation of the printer and configured to command a maintenance guide for a maintenance work of solving the error, and a moving image memory storing moving images for successively and continuously displaying a whole process of the maintenance guide from start to end at once on the display unit by the operation of the guide command button.

According to a second aspect, there is provided a printer maintenance guide device with a printer main body, a print paper sheet feed unit for feeding a print paper sheet, a printing unit for performing printing on the print paper sheet and an operation unit and a display unit for operating the printing unit, the printer maintenance guide device including a guide command button enabling any one of various maintenance operations of the printer to be selected by displaying contents of the various maintenance operations on the display unit and configured to command a maintenance guide for a maintenance work of performing the selected maintenance operation, and a moving image memory storing moving images for successively and continuously displaying a whole process of the maintenance guide from start to end at once on the display unit by the operation of the guide command button.

Further, there is provided a printer maintenance guide device with a printer main body, a print paper sheet feed unit for feeding a print paper sheet, a printing unit for performing printing on the print paper sheet and an operation unit and a display unit for operating the printing unit, wherein a display area is divided into a plurality of necessary areas in the display unit when an error occurs in the operation of the printer, at least a content of the error and a guide command mark as a help icon for a maintenance work of solving the error are displayed, the guide command mark is confirmed, the displaying of moving images is requested by the operation of a guide command button for commanding a maintenance guide for the maintenance work of solving the error and moving images of the maintenance guide corresponding to the error content are displayed on the display unit on the basis of the request.

According to a third aspect, there is provided a printer maintenance guide method with a printer main body, a print paper sheet feed unit for feeding a print paper sheet, a printing unit for performing printing on the print paper sheet and an operation unit and a display unit for operating the printing unit, the printer maintenance guide method including displaying a content of an error on the display unit when the error occurs in the operation of the printer, and successively and continuously displaying a whole process of a maintenance guide for a maintenance work of solving the error from start to end at once on the display unit by moving images by the operation of a guide command button provided to command the maintenance guide.

According to a fourth aspect, there is provided a printer maintenance guide method with a printer main body, a print paper sheet feed unit for feeding a print paper sheet, a printing unit for performing printing on the print paper sheet and an operation unit and a display unit for operating the printing unit, the printer maintenance guide method including displaying contents of various maintenance operations of the printer on the display unit, selecting any one of the maintenance operations, and successively and continuously displaying a whole process of a maintenance guide for a maintenance work of performing the selected maintenance operation from start to end at once on the display unit by moving images by the operation of a guide command button provided to command the maintenance guide.

A guide stop button capable of pausing and resuming the moving images may be provided.

A guide rewind button enabling the moving images to be rewound to a start screen and played back may be provided.

An audio guide corresponding to the maintenance guide together with the moving images may be provided.

A language guide corresponding to the maintenance guide together with the moving images may be displayed.

A required time of the maintenance guide together with the moving images may be displayed A mounting angle of the display unit may be switched and the display unit enables the maintenance work to be performed while the moving images are viewed.

The display unit may be so arranged that the maintenance work is executable in the printer main body in accordance with the maintenance guide.

The display unit may be detachably attachable to the printer main body.

The moving images may be displayed an essential guide part which is an essential part of the maintenance guide in a still state for a predetermined set time.

A human sensor may be provided near the display unit, and the moving images may be paused when the human sensor is not sensing an operator near the display unit.

In the printer maintenance guide device and the printer maintenance guide method according to the above aspects, the whole process of the maintenance guide is displayed at once by the moving images. Thus, even a novice or an unfamiliar person can perform a necessary work and be guided to reliably perform the work at ease after grasping the entire maintenance guide, i.e. after recognizing the entire operation.

Particularly, according to the printer maintenance guide device of the first aspect, the moving image memory enabling the whole process of the maintenance guide to be displayed at once is provided. Thus, when an error occurs in the printer, the operator can start a necessary work after grasping the whole process of the maintenance work corresponding to the error content.

Particularly, according to the printer maintenance guide device of the second aspect, the moving image memory enabling the whole process of the maintenance guide for an arbitrary maintenance operation to be displayed at once is provided. Thus, the operator can start a necessary work after grasping the whole process of the maintenance work corresponding to the selected maintenance operation according to need.

Particularly, according to the printer maintenance guide method of the third aspect, the whole process of the maintenance guide corresponding to an error content is displayed at once by the moving images when an error occurs in the printer. Thus, the operator can be guided to start a necessary work after grasping the whole process.

Particularly, according to the printer maintenance guide method of the fourth aspect, the whole process of the maintenance guide for an arbitrary maintenance operation is displayed at once by the moving images. Thus, the operator can be guided to start a necessary work after grasping the whole process.

DESCRIPTION OF EMBODIMENT

In an embodiment of the present invention, a printer maintenance guide device and a printer maintenance guide method are realized which are designed to display a whole process of a maintenance guide at once by moving images and enable even a novice or an unfamiliar person to perform a necessary maintenance work and be guided to reliably perform the work at ease after grasping the whole maintenance guide.

A printer maintenance guide device and a printer maintenance guide method according to the embodiment of the present invention are described below on the basis of FIGS. 1 to 6D.

Figure 1:
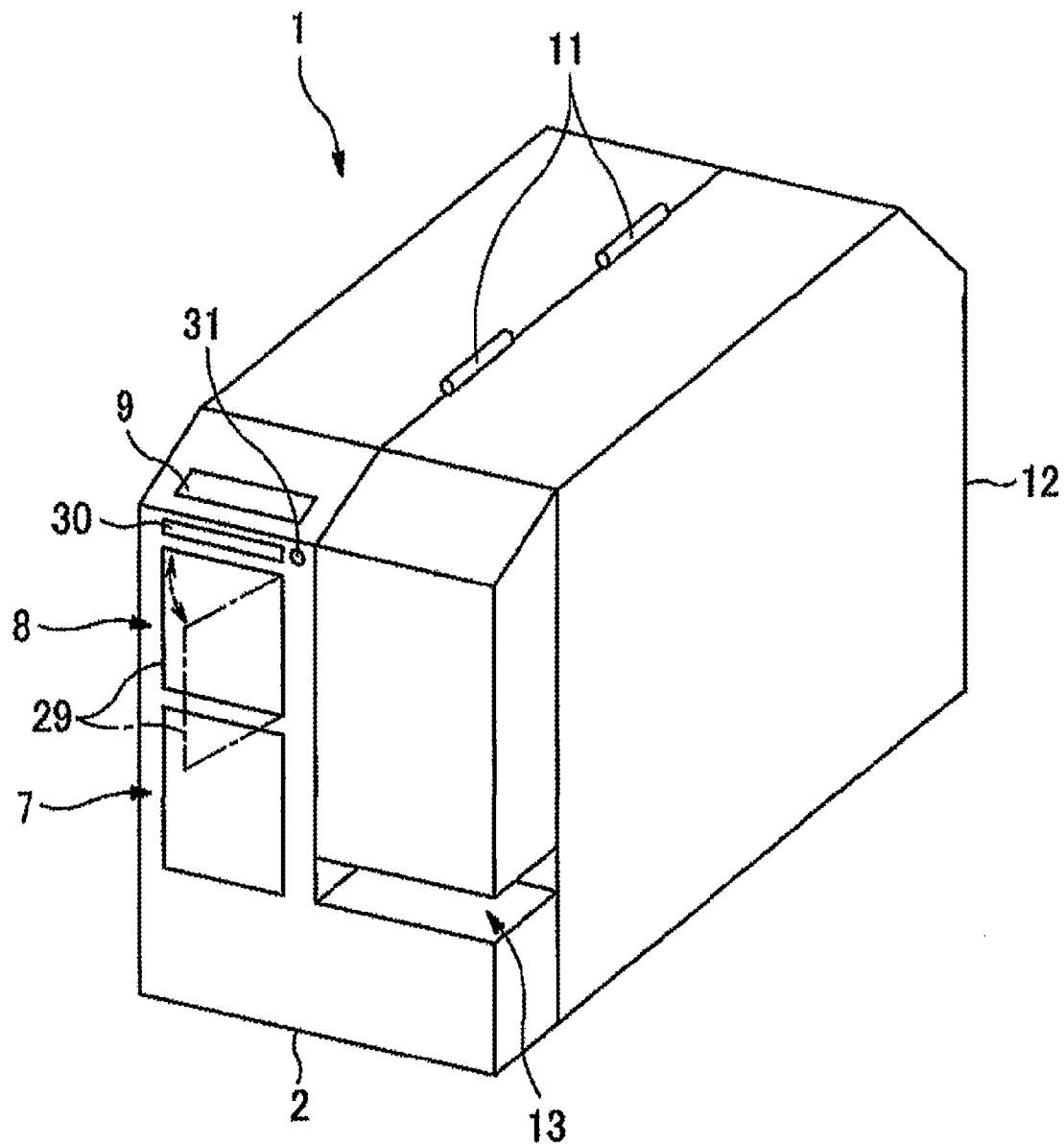
FIG. 1 is a perspective view of a printer (e.g. thermal transfer label printer) by an arbitrary printing method equipped with a maintenance guide device according to an embodiment of the present invention.
Figure 2:
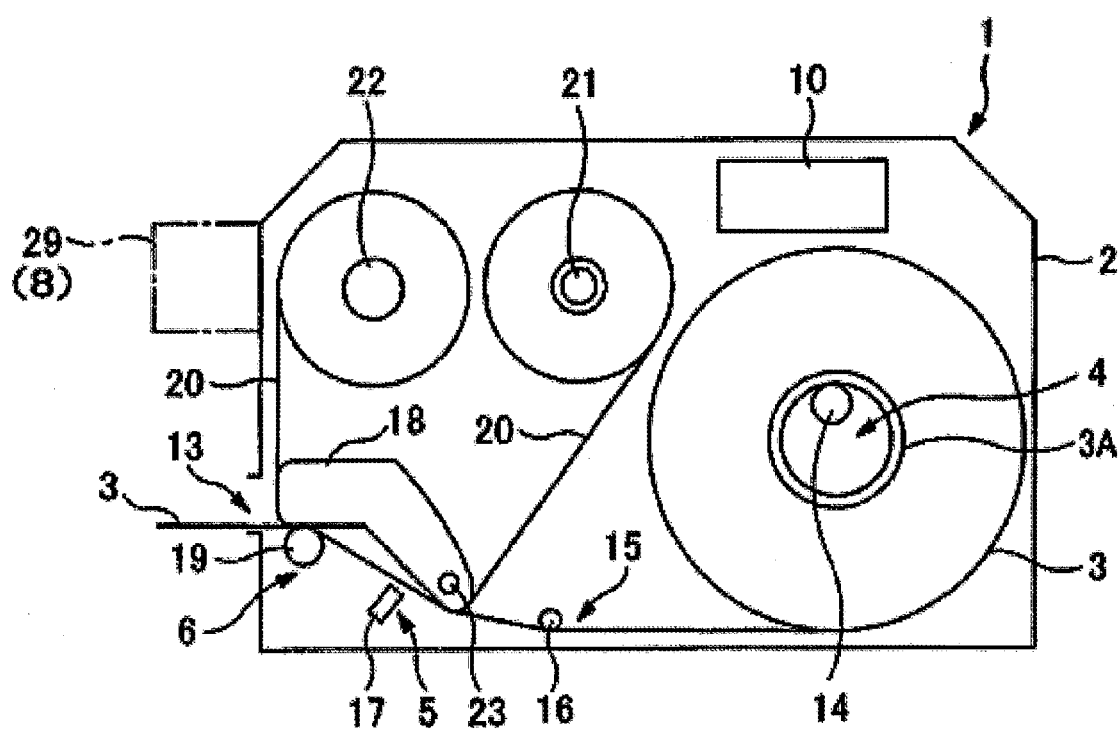
FIG. 2 is a schematic side view of the thermal transfer label printer.

FIG. 1 is a perspective view of a printer (e.g. thermal transfer label printer 1) by an arbitrary printing method and FIG. 2 is a schematic side view of the thermal transfer label printer 1. The thermal transfer label printer 1 includes a printer main body 2, a print paper sheet feed unit 4 for print paper sheet (label continuous body 3), a detection unit 5, a printing unit 6, an operation unit 7, a display unit 8, a power switch 9 and a control unit 10.

The printer main body 2 includes an opening/closing cover 12 which can be opened and closed about a cover opening/closing shaft 11, and a work of mounting the label continuous body 3 or a thermal transfer ink ribbon (described later) and a maintenance work to be described later can be performed in the thermal transfer label printer 1 as shown in FIG. 2 by opening the opening/closing cover 12.

Also, the printed label continuous body 3 is ejected from a label issuance opening 13 between the printer main body 2 and the opening/closing cover 12.

The label continuous body 3 is a label of an arbitrary form such as a label with a liner sheet or a linerless label, and is rotatably mounted on a holding shaft 14 of the print paper sheet feed unit 4 in a state rolled on a support tube 3A. A tag not coated with an adhesive layer or the like may be adopted as the print paper sheet.

The strip-like label continuous body 3 can be fed in a direction toward the detection unit 5 and the printing unit 6 via a guide roller 16 on a transfer path 15 from the print paper sheet feed unit 4.

The detection unit 5 includes a position detection sensor 17 and can detect a relative positional relationship of the label continuous body 3 with the printing unit 6 by detecting a position detection mark (not shown) printed in advance, for example, on the underside of the label continuous body 3.

The printing unit 6 includes a thermal head 18, a platen roller 19 and a ribbon supply shaft 21 and a ribbon roll-up shaft 22 for a thermal transfer ink ribbon 20.

The label continuous body 3 and the thermal transfer ink ribbon 20 are overlapped and nipped at a predetermined printing pressure between the thermal head 18 and the platen roller 19, predetermined information can be printed on the label continuous body 3 by rotating and driving the platen roller 19 and supplying print data to the thermal head 18, and the label continuous body 3 and the thermal transfer ink ribbon 20 eject the printed label continuous body 3 from the label issuance opening 13.

Further, the thermal head 18 is openable and closable with respect to the platen roller 19 by being rotated about a head opening/closing shaft 23 thereof, thereby enabling the label continuous body 3 and the thermal transfer ink ribbon 20 to be mounted between the thermal head 18 and the platen roller 19.

Also, a cutting unit (not shown) including a cutter may be provided downstream of the printing unit 6 or the label issuance opening 13 according to need or an RFID antenna unit (not shown) may also be mounted at a predetermined position of the transfer path 15.

Figure 3:
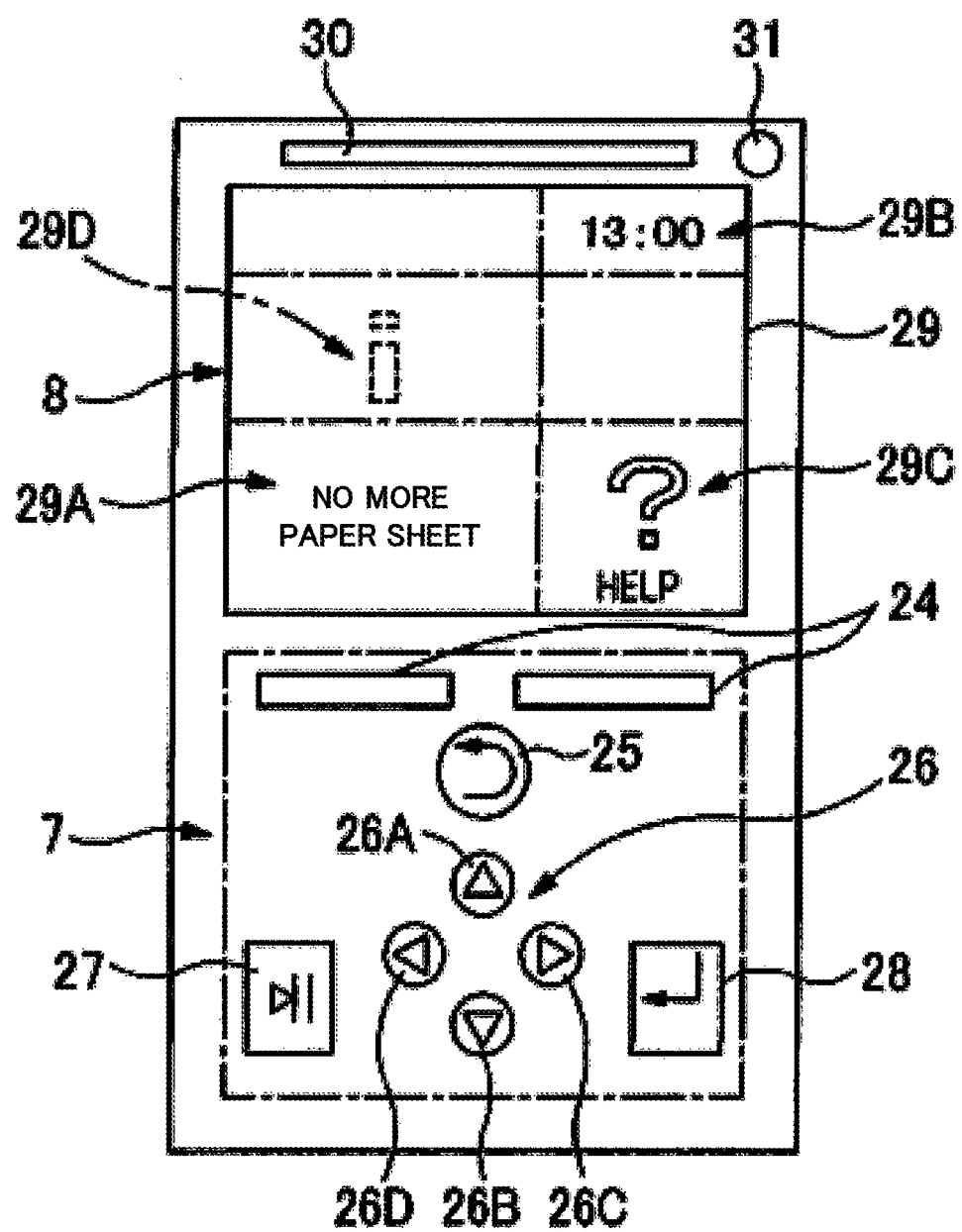
FIG. 3 is a diagram of an operation unit and a display unit provided on one side surface of a printer main body.

FIG. 3 is a diagram of the operation unit 7 and the display unit 8 provided on one side surface of the printer main body 2.

The operation unit 7 includes a pair of left and right function keys 24, a cancel key 25, navigation keys 26, a play/pause key 27 and an enter key 28.

The function key 24 can switch its function according to an operation mode of the thermal transfer label printer 1.

The cancel key 25 returns a display on the display unit 8 to one previous screen.

The navigation keys 26 include two pairs of upper and lower, right and left arrow keys, i.e. an up-direction arrow key 26A, a down-direction arrow key 26B, a right-direction arrow key 26C and a left-direction arrow key 26D.

The play/pause key 27 functions as an online/offline changeover button and a guide stop button capable of pausing and resuming moving images to be described later.

The enter key 28 is a button for determining a selected content.

The display unit 8 includes a liquid crystal display 29 and a light emitting diode 30 is mounted at a position above the liquid crystal display.

The liquid crystal display 29 can display various contents necessary to operate the thermal transfer label printer 1 and its printing unit 6 and can successively and continuously display a whole process of a maintenance guide for a maintenance work of solving an error from start to end at once by moving images (arbitrary moving images such as photographed images including video images and animation) particularly when this error occurs in the operation of the thermal transfer label printer 1. Further, the liquid crystal display 29 can display a maintenance guide corresponding to a selected one of various maintenance operations of the thermal transfer label printer 1 regardless of the occurrence of an error.

The light emitting diode 30 is lighted when the power switch 9 is turned on and performs light emission processings corresponding to various operations.

Also, a human sensor 31 is mounted at an arbitrary position such as the vicinity of the display unit 8 of the printer main body 2 so that an operator near or before the thermal transfer label printer 1 (display unit 8) can be sensed.

Figure 4:
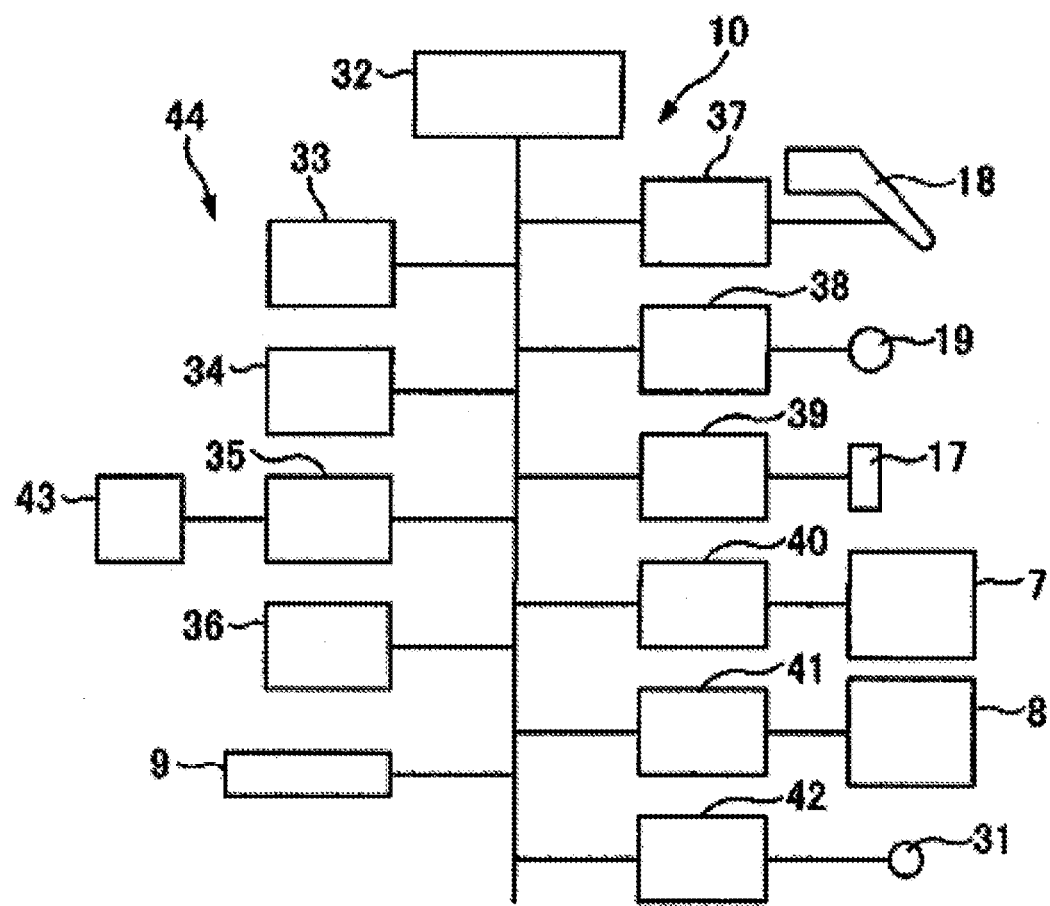
FIG. 4 is a block diagram of a control unit of the thermal transfer label printer.

FIG. 4 is a block diagram of the control unit 10 of the thermal transfer label printer 1. The control unit 10 includes a CPU 32, a ROM 33, a RAM 34, an interface 35, a moving image memory 36, a head controller 37, a platen roller controller 38, a position detection sensor controller 39, an operation controller 40, a display controller 41 and a human sensor controller 42.

An arbitrary personal computer 43 is connected to the interface 35, and the thermal transfer label printer 1 can be controlled according to need. Needless to say, the thermal transfer label printer 1 can also independently operate.

A maintenance guide device 44 is configured by the control unit 10, the operation unit 7 and the display unit 8 described above.

In the thermal transfer label printer 1 and the maintenance guide device 44 thus configured, a whole process of a maintenance guide can be successively and continuously displayed from start to end thereof at once on the display unit 8 (liquid crystal display 29) by moving images by the maintenance guide device 44 for various maintenance operations necessary for the thermal transfer label printer 1 when an error occurs in the operation of the thermal transfer label printer 1 or even if no error has occurred.

Figure 5:
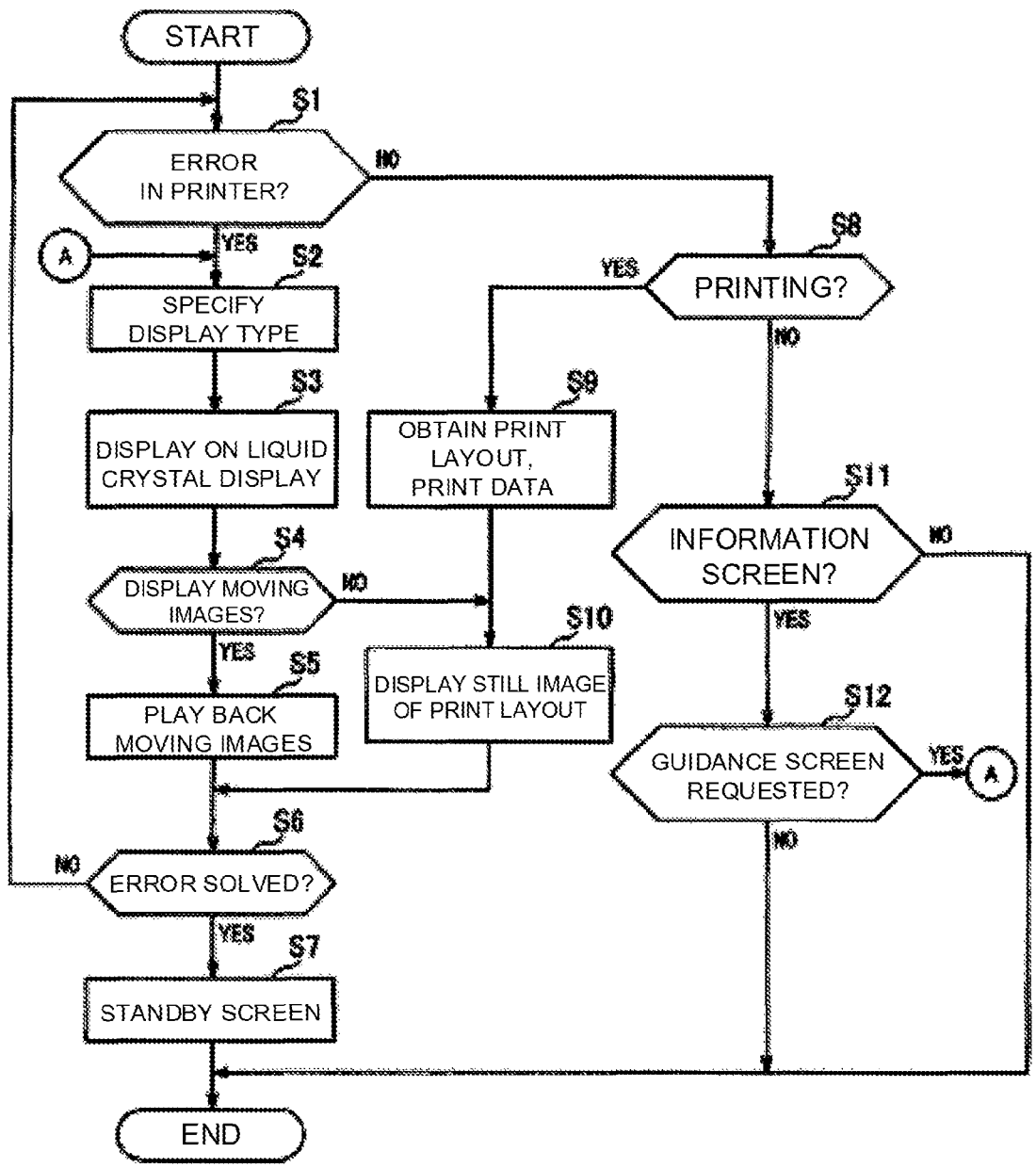
FIG. 5 is a flow chart of a maintenance guide method by the maintenance guide device.

Specifically, FIG. 5 is a flow chart of a maintenance guide method by the maintenance guide device 44. In Step S1, it is judged whether or not any error has occurred in the thermal transfer label printer 1.

Contents of the error include the exhaustion of the label continuous body 3 and the thermal transfer ink ribbon 20, a paper sheet jam, a ribbon jam and the like as described above. The following description is given, taking as an example a case where the label continuous body 3 has been exhausted.

When an error occurs, a display type is specified in Step S2.

Specifically, the exhaustion of the label continuous body 3 is specified as an error content and the exhaustion of the label continuous body 3 is displayed (i.e. the content of the specified display type is displayed) on the display unit 8 (liquid crystal display 29), thereby presenting it to the operator in Step S3.

In the present embodiment, as a display example of this error content, an error content 29A to the effect that the "label continuous body 3 has been exhausted", a time 29B with a clock function such as "13:00" and a guide command mark 29C such as by "? mark" as a help icon are displayed with the liquid crystal display 29 divided into a plurality of necessary display areas, for example, as shown in FIG. 3.

The enter key 28 is used in addition to the guide command mark 29C as a guide command button for commanding a maintenance guide for a maintenance work of solving this error.

A plan can be notified to the operator by clearly specifying a required time of the maintenance guide such as "moving images of maintenance guide are displayed for 50 seconds", for example, in the display area of the time 29B together with a display of the error content 29A.

In Step S4, it is judged whether or not moving images are to be displayed.

Specifically, the operator confirms this guide command mark 29C and requests the display of the moving images by pressing the enter key 28, and the playback of the moving images is started on the basis of this request (Step S5). Also, the operator who needs not view the maintenance guide may perform a predetermined maintenance work without operating the enter key 28.

The whole process of the maintenance guide from start to end can be successively and continuously displayed at once on the display unit 8 (liquid crystal display 29) by moving images by the operation of this guide command button (enter key 28 corresponding to the display of the guide command mark 29C).

Of course, necessary moving images are prepared in the moving image memory 36 according to each error content.

The operator mounts and sets the label continuous body 3 in the thermal transfer label printer 1 (i.e. performs the maintenance work) to solve this error by reference to this maintenance guide by the moving images.

Also, the operator can stop/play back the content of the moving images according to need and confirm the content at his own pace by providing a guide stop button (play/pause key 27) capable of pausing and resuming the moving images.

Further, the moving images can be played back a necessary number of times by providing a guide rewind button (up-direction arrow key 26A) enabling the moving images to be rewound to the start screen. Also, the cancel key 25 may be allotted as the guide rewind button.

Also, instead of providing the operation unit 7 with the play/pause key 27, the cancel key 25, the navigation keys 26, the enter key 28 and the like as mechanical buttons, the guide command button (enter key 28 or guide command mark 29C), the guide stop button (play/pause key 27), the guide rewinding button (cancel key 25 or navigation keys 26) or the like of a touch panel type may be displayed on the liquid crystal display 29 of the display unit 8.

Figure 6A:
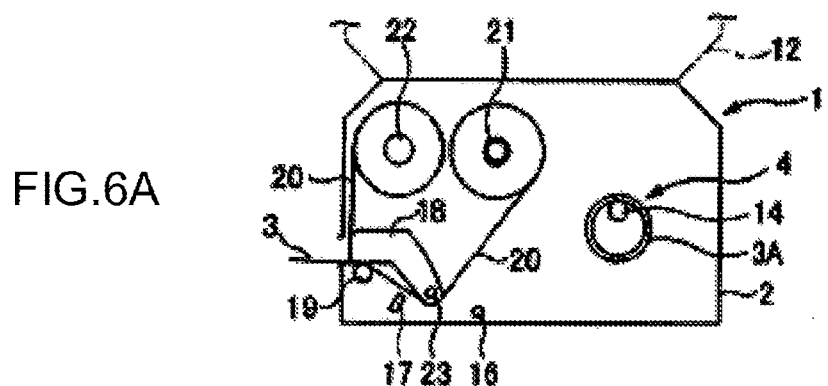
FIG. 6A is a schematic side view showing the interior of the printer main body with an opening/closing cover opened.
Figure 6B:
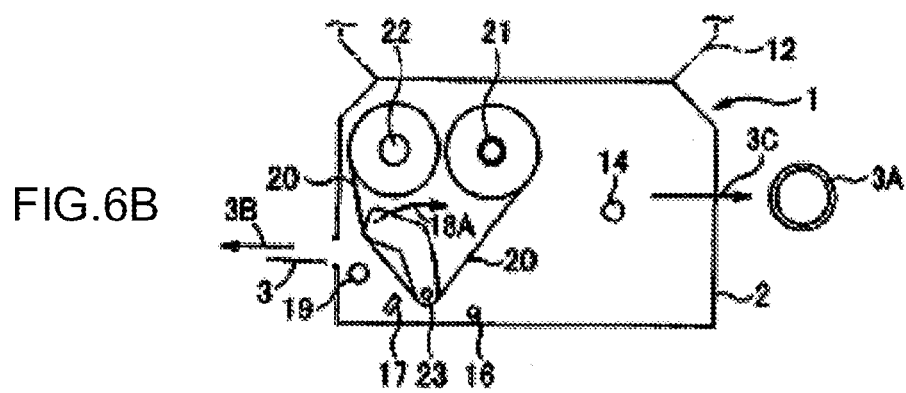
FIG. 6B is a schematic side view showing a process of removing a label continuous body remaining in a printing unit and a support tube of the label continuous body remaining in a print paper sheet feed unit (holding shaft) by rotating and opening a thermal head to be separated from a platen roller.
Figure 6C:
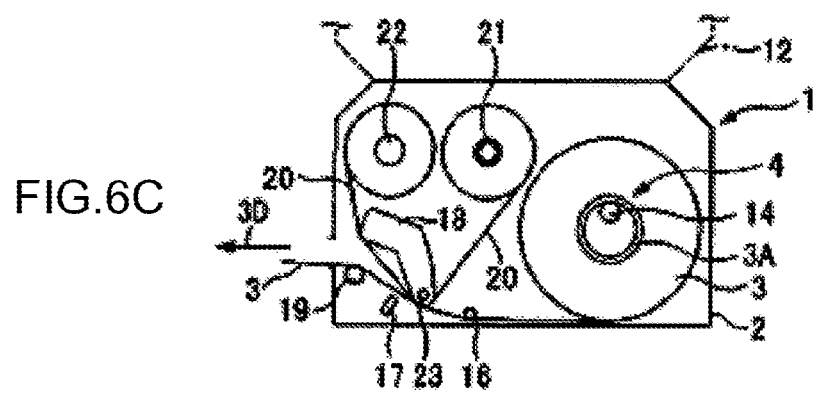
FIG. 6C is a schematic side view showing a process of holding a new label continuous body on the holding shaft and inserting it between the thermal head and the platen roller.
Figure 6D:
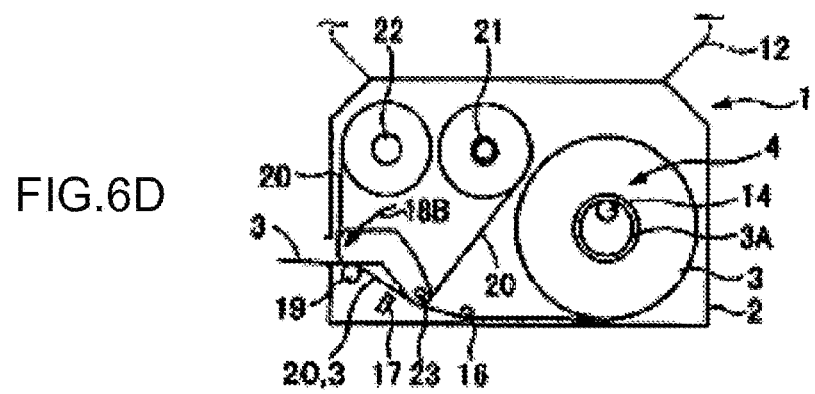
FIG. 6D is a schematic side view showing a process of nipping the label continuous body together with a thermal transfer ink ribbon by rotating and closing the thermal head with respect to the platen roller.

FIGS. 6A to 6D are diagrams showing an example of these moving images as essential screens. FIG. 6A is a schematic side view showing the interior of the printer main body 2 with the opening/closing cover 12 opened. FIG. 6B is a schematic side view showing a process of removing the label continuous body 3 remaining in the printing unit 6 and the support tube 3A of the label continuous body 3 remaining in the print paper sheet feed unit 4 (holding shaft 14) by rotating and opening the thermal head 18 to be separated from the platen roller 19. FIG. 6C is a schematic side view showing a process of holding a new label continuous body 3 on the holding shaft 14 and inserting it between the thermal head 18 and the platen roller 19. FIG. 6D is a schematic side view showing a process of nipping the label continuous body 3 together with the thermal transfer ink ribbon 20 by rotating and closing the thermal head 18 with respect to the platen roller 19.

Specifically, by viewing the moving image represented by FIG. 6A, the operator can confirm that there is no more label continuous body 3 on the holding shaft 14 of the print paper sheet feed unit 4 and a small rear end part of the label continuous body 3 is remaining in the printing unit 6 when the opening/closing cover 12 is opened.

A transfer is made from the moving image of FIG. 6A to that of FIG. 6B and, by viewing the moving image represented by FIG. 6B, the operator can confirm the removal of the remaining label continuous body 3 (see an arrow 3B for supplementary explanation in FIG. 6B) and the removal of the support tube 3A of the label continuous body 3 (see an arrow 3C for supplementary explanation in FIG. 6B) by rotating and opening the thermal head 18 to be separated from the platen roller 19 (see an arrow 18A for supplementary explanation in FIG. 6B).

A transfer is made from the moving image of FIG. 6B to that of FIG. 6C and, by viewing the moving image represented by FIG. 6C, the operator can confirm to set a new label continuous body 3 on the holding shaft 14 and insert the label continuous body 3 between the thermal head 18 and the platen roller 19 via the guide roller 16 (see an arrow 3D for supplementary explanation in FIG. 6C).

A transfer is made from the moving image of FIG. 6C to that of FIG. 6D and, by viewing the moving image represented by FIG. 6D, the operator can confirm to nip the label continuous body 3 together with the thermal transfer ink ribbon 20 by rotating and closing the thermal head 18 with respect to the platen roller 19 (see an arrow 18B for supplementary explanation in FIG. 6D).

Also, the moving images are so created that the operator can reliably see and confirm essential guide parts by enabling the essential guide parts which are essential parts of the maintenance guide, e.g. each of the scenes displayed in FIGS. 6A to 6D, to be displayed in a still state for a predetermined set time so as not be overlooked.

Alternatively, it is also possible to discontinuously display only each essential guide part (e.g. only essential guide parts shown in FIGS. 6A to 6D) by operating the right-direction arrow key 26C and the left-direction arrow key 26D on the basis of the operator's intention.

Further, the human sensor 31 is provided near the display unit 8 and it is possible to pause the moving images when this human sensor 31 senses no operator near the display unit 8 and control to automatically resume the moving images from the stopped image when the human sensor 31 senses the operator again.

Also, in the present embodiment, a mounting angle of the display unit 8 (liquid crystal display 29) with respect to the printer main body 2 can be switched between a mounting surface for the display unit 8 and the operation unit 7 and a surface substantially at a right-angle position particularly as shown by a virtual line in FIGS. 1 and 2. The maintenance work can be easily performed while the moving images are viewed as described above by making an angle of viewing the interior of the printer main body 2 (posture of the operator) and an angle of viewing the liquid crystal display 29 (posture of the operator) substantially equal.

Specifically, the display unit 8 (liquid crystal display 29) can be arranged on a surface identical or equivalent to the surface where the interior of the printer main body 2 can be looked over so that the maintenance work can be performed in the printer main body 2 while the moving images of the maintenance guide are viewed.

Further, the display unit 8 (liquid crystal display 29) enables the operator to perform the maintenance work in the printer main body 2 in an arbitrary posture easy to view the liquid crystal display 29 by being made detachably attachable to the printer main body 2 and in a state where wired or wireless data communication with the control unit 10 of the printer main body 2 is possible.

Furthermore, in the present embodiment, an audio guide corresponding to the maintenance guide can be provided by an arbitrary technique together with the moving images as described above.

Further, a language guide corresponding to the maintenance guide can be displayed together with the moving images on the liquid crystal display 29. This language guide can be prepared integrally to or separately from the moving images and the language guide of each language can be prepared.

In Step S6 following the playback of the moving images in Step S5, it is judged whether or not the error has been solved. A return is made to Step S1 unless the error has been solved, whereas a standby screen is displayed in Step S7 to indicate that the thermal transfer label printer 1 is in a state capable of the next printing operation when the error has been solved.

Also, a control to transfer to Step S7 is possible by the operator pressing a predetermined button (e.g. play/pause key 27) after performing a series of maintenance processings including those of FIGS. 6A to 6D.

When no error has occurred in the thermal transfer label printer 1 in Step S1, it is judged in Step S8 whether or not to perform printing by the thermal transfer label printer 1. When printing is to be performed, a print layout and print data are obtained and printing is performed in Step S9 and a still image of the print layout being currently printed is displayed in Step S10.

Unless printing is to be performed in Step S8, it is judged in Step S11 whether or not an information screen is on display.

Here, the information screen is a screen enabling the operator to arbitrarily select a predetermined function or processing from a menu screen displayed on the liquid crystal display 29 of the display unit 8 by a tree structure. Since this information screen is displayed in a mode different from the one in which the error content 29A and the guide command mark 29C of the liquid crystal display 29 are displayed, an access can be made by selecting an information mark 29D such as by an "i mark" as shown by a virtual line in FIG. 3 by means of the enter key 28 or the like.

Unless this information screen is selected, an exit is made from this series of processings.

The display of the information screen is selected and it is judged in Step S12 whether or not the operator is requesting a guidance screen in the information screen. When it is requested, a transfer is made to Step S2 to specify the display type and the processings in Step S3 and subsequent Steps described above are performed.

Here, the guidance screen is a screen including maintenance guides in the event of errors and listing up the maintenance guides for a maintenance work of performing various maintenance operations of the thermal transfer label printer 1, and displayed on the liquid crystal display 29 similarly to the information screen, and the operator can select or instruct an arbitrary maintenance guide by means of the navigation keys 26 and the enter key 28 (guide command button).

Specifically, in the maintenance guide device 44 according to the present embodiment, the moving images displayed on the display unit 8 can show the maintenance guides for the maintenance work of performing various maintenance operations of the thermal transfer label printer 1, including the maintenance guides in the event of errors.

The various maintenance operations include general operations such as an exchanging work and a cleaning work of the position detection sensor 17, the thermal head 18 and the platen roller 19 and, further, the cutting unit and an RFID antenna provided according to need, and various button operations, let alone the mounting of the label continuous body 3 and the thermal transfer ink ribbon 20 into the thermal transfer label printer 1 described above.

When the cleaning work of the thermal head 18 is, for example, selected and requested by operating the navigation keys 26, the enter key 28 and the like on the above guidance screen, a thermal head cleaning work is specified as the display type (Step S2) and moving images of that maintenance work (cleaning work) are continuously displayed on the liquid crystal display 29 (Step S5).

Also, in the case of transfer from Step S12 to Step S4 and Step S5, the above navigation keys 26 and enter key 28 can be used as the guide command buttons used by the operator. Assuming that the display of the moving images is already commanded in Step S12, a control can be executed to automatically transfer from Step S4 to Step S5. Of course, in the case of transfer from Step S12 to Step S4 and Step S5, it is also possible to control to command the display of the moving images anew using the guide command mark 29C such as by the "? mark" and the enter key 28 as the guide command buttons as in the case of commanding a maintenance guide in the event of an error to transfer from Step S1 to Steps S4 and S5.

Accordingly, the operator can select the maintenance guide of the maintenance work he desires to confirm and improve a skill in the operation of the thermal transfer label printer 1 by viewing the whole moving images even if an unpredictable error occurs during a print issuing operation of the thermal transfer label printer 1.

In this way, the whole process of the maintenance guide from start to end is successively and continuously displayed at once on the display unit 8 by the moving images by the operation of the guide command button (navigation keys 26, guide command mark 29C, enter key 28, etc.) provided to command the maintenance guide for the maintenance work when an error occurs in the operation of the thermal transfer label printer 1 or even if no error occurs. Thus, even an operator unfamiliar with various maintenance works can reliably perform the maintenance work at ease after grasping the whole process of the maintenance guide.

Although the embodiment of the present invention has been described above, the above embodiment is merely one application example of the present invention and not intended to limit the technical scope of the present invention to the specific configuration of the above embodiment.

The invention claimed is:

1. A printer maintenance guide device, comprising:
a printer main body;
a print paper sheet feed unit configured to feed a print paper sheet;
a printer configured to perform printing on the print paper sheet;
an operation unit configured to operate the printer;
a display; and
a control unit configured to control the display to display a content of an error when an error occurs in an operation of the printer,
wherein
the operation unit has a guide command button to command a maintenance guide for maintenance work of solving the error; and
the control unit is configured to display photographed video images for successively and continuously displaying a whole process of the maintenance guide from start to end at once on the display with an arrow for supplementary explanation of the maintenance guide, by operation of the guide command button.

2. The printer maintenance guide device of claim 1, wherein
the control unit is configured to:
display the printer on the display; and
indicate a part for the maintenance work by the arrow.

3. The printer maintenance guide device of claim 1, wherein
the control unit is configured to:
divide the display into a plurality of necessary areas when an error occurs in the operation of the printer; and
display at least a content of the error and a guide command mark for maintenance work of solving the error; and
display the photographed video images requested by the operation of the guide command button for commanding a maintenance guide for the maintenance work of solving the error.

4. The printer maintenance guide device of claim 1, wherein
the control unit is configured to display a language guide corresponding to the maintenance guide together with the photographed video images on the display.

5. The printer maintenance guide device according to claim 1, wherein
the operation unit and the display are provided on a label issuance opening side.

6. The printer maintenance guide device according to of claim 1, wherein
the operation unit is configured to display a still image of a print layout being currently printed.

7. A printer maintenance guide device, comprising:
a printer main body;
a printer paper sheet feed unit configured to feed a print paper sheet;
a printer configured to print on the print paper sheet;
an operation unit configured to operate the printer;
a display; and
a control unit configured to display contents of various maintenance operations of the printer on the display and to select any one of various maintenance operations,
wherein
the operation unit has a guide command button to command a maintenance guide for maintenance work of a selected maintenance operation; and
the control unit is configured to display photographed video images for successively and continuously displaying a whole process of the maintenance guide from start to end at once on the display with an arrow for supplementary explanation of the maintenance guide, by operation of the guide command button.

8. A method of assisting maintenance, with a printer maintenance guide, of a printing unit having a printer main body, a print paper sheet feed unit configured to feed a print paper sheet, a printer configured to perform printing on the print paper sheet, and an operation unit configured to operate the printer, the operation unit having a guide command button to command the maintenance guide for maintenance work of solving an error; and a display, the method comprising:
displaying content of the error on the display when the error occurs in operation of the printer; and
displaying photographed video images for successively and continuously displaying a whole process of the maintenance guide from start to end at once on the display together with an arrow for supplementary explanation of the maintenance guide, by operation of the guide command button.

9. A method of assisting maintenance with a printer maintenance guide of a printing unit having a printer main body, a print paper sheet feed unit configured to feed a print paper sheet, a printer configured to print on the print paper sheet and an operation unit configured to operate the printer, the operation unit having a guide command button to command a maintenance guide for a selected maintenance work, and a display, comprising:
displaying contents of various maintenance operations of the printer on the display, the display being configured to receive selection of any one of various maintenance operations; and
displaying photographed video images for successively and continuously displaying a whole process of the maintenance guide from start to end at once on the display together with an arrow for supplementary explanation of the maintenance guide, by operation of the guide command button.

* * * * *